(12) United States Patent
Kim

(10) Patent No.: US 12,542,957 B2
(45) Date of Patent: Feb. 3, 2026

(54) CAMERA MODULE

(71) Applicant: SAMSUNG ELECTRO-MECHANICS CO., LTD., Suwon-si (KR)

(72) Inventor: Hongkwan Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 3 days.

(21) Appl. No.: 18/799,059

(22) Filed: Aug. 9, 2024

(65) Prior Publication Data

US 2025/0337997 A1 Oct. 30, 2025

(30) Foreign Application Priority Data

Apr. 25, 2024 (KR) .......................... 10-2024-0055453

(51) Int. Cl.
*H04N 23/51* (2023.01)
*G03B 30/00* (2021.01)
(Continued)

(52) U.S. Cl.
CPC ............. *H04N 23/51* (2023.01); *G03B 30/00* (2021.01); *H01L 23/552* (2013.01); *H04N 23/52* (2023.01);
(Continued)

(58) Field of Classification Search
CPC ...... H04N 23/51; H04N 23/52; H01L 23/552; H01L 2225/06537; H01L 2924/3025; G03B 30/00
See application file for complete search history.

(56) References Cited

U.S. PATENT DOCUMENTS

2010/0157137 A1* 6/2010 Imai .......................... G02B 7/02
 348/E5.037
2015/0281528 A1* 10/2015 Li .......................... H04N 23/51
 348/357
(Continued)

FOREIGN PATENT DOCUMENTS

KR 10-2010-0066809 A 6/2010
KR 10-2010-0115161 A 10/2010
(Continued)

OTHER PUBLICATIONS

Korean Office Action Issued on Apr. 14, 2025, in Counterpart Korean Patent Application No. 10-2024-0055453 (4 Pages in English, 4 Pages in Korean).

(Continued)

*Primary Examiner* — Lin Ye
*Assistant Examiner* — Chriss S Yoder, III
(74) *Attorney, Agent, or Firm* — NSIP Law

(57) ABSTRACT

A camera module includes a housing configured to accommodate a lens barrel; a first circuit board, disposed below the housing, including a first ground pad; a shield cover configured to cover the housing; a second circuit board, disposed on one side surface of the housing, including a second ground pad corresponding to the first ground pad; a first solder connecting the first ground pad and the second ground pad; and a second solder connecting the shield cover and the second ground pad. The second ground pad comprises a first connection part connected to the first ground pad through the first solder and a second connection part connected to the shield cover through the second solder.

15 Claims, 7 Drawing Sheets

(51) Int. Cl.
*H01L 23/552* (2006.01)
*H04N 23/52* (2023.01)

(52) U.S. Cl.
CPC .............. *H01L 2225/06537* (2013.01); *H01L 2924/3025* (2013.01)

(56) References Cited

U.S. PATENT DOCUMENTS

2016/0276288 A1\* 9/2016 Lee .................. H01L 24/97
2016/0344919 A1\* 11/2016 Cho .................. H04N 23/54
2018/0324338 A1 11/2018 Chung et al.
2025/0016449 A1\* 1/2025 Kim .................. H04N 23/687

FOREIGN PATENT DOCUMENTS

| KR | 10-2010-0116310 A | 11/2010 |
| KR | 10-2010-0123104 A | 11/2010 |
| KR | 10-2016-0137330 A | 11/2016 |
| KR | 10-2020-0051556 A | 5/2020 |
| KR | 10-2022-0070388 A | 5/2022 |
| KR | 10-2023-0006426 A | 1/2023 |
| KR | 10-2023-0048491 A | 4/2023 |

OTHER PUBLICATIONS

Korean Notice of Allowance issued on Sep. 27, 2025, in corresponding Korean Patent Application No. 10-2024-0055453. (2 pages in English, 2 pages in Korean).

\* cited by examiner

CAMERA MODULE

CROSS-REFERENCE TO RELATED APPLICATIONS

This application claims the benefit under 35 USC 119(a) of Korean Patent Application No. 10-2024-0055453 filed on Apr. 25, 2024, in the Korean Intellectual Property Office, the entire disclosure of which is incorporated herein by reference for all purposes.

BACKGROUND

1. Field

The following description relates to a camera module.

2. Description of the Background

Cameras, used in portable electronic devices such as smartphones, tablet PCs, and laptops, may have many electronic components installed inside. It may be desirable to minimize the emission of electromagnetic waves from inside the electronic components. In addition, mitigating damage to internal electronic components due to external noise current flowing in from the outside may be desired. The camera module mounted inside the electronic device may prevent electromagnetic waves from leaking out by grounding the cover to the circuit board.

Conventional camera modules mainly use conductive tape for grounding, but in order to avoid the thickness of the conductive tape used affecting the thickness of the camera module, the grounding method is gradually changing to a soldering method. The soldering method of grounding has a problem in that the soldering part protrudes to the outside of the circuit board and affects other components.

Meanwhile, in the case of image sensors mounted on recent camera modules, there is a growing tendency to adopt large 1-inch models. As a result, the size and weight of the lens and actuator increase, increasing the risk of cracks occurring in the soldering part of the camera module.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing configured to accommodate a lens barrel; a first circuit board, disposed below the housing, including a first ground pad; a shield cover configured to cover the housing; a second circuit board, disposed on one side surface of the housing, including a second ground pad corresponding to the first ground pad; a first solder connecting the first ground pad and the second ground pad; and a second solder connecting the shield cover and the second ground pad. The second ground pad comprises a first connection part connected to the first ground pad through the first solder and a second connection part connected to the shield cover through the second solder.

The shield cover may have a surface and a through hole extending through the surface to expose a part of the second ground pad.

The second solder may be accommodated in the through hole.

The shield cover and the first solder may be spaced apart.

A separation space may be formed between the first circuit board and the lower end of the shield cover, and the first solder may be disposed in the separation space.

The first solder or the second solder may be formed planar to an outer surface of the shield cover.

An image sensor, disposed on the first circuit board, may be configured to convert light incident through the lens barrel into an electric signal, and the second circuit board may be a flexible circuit board or a rigid flexible circuit board.

The first circuit board may include a first signal pad, and the second circuit board may include a second signal pad. The camera module may further include a third solder connecting the first signal pad and the second signal pad.

The second ground pad may be longer than the second signal pad.

In another general aspect, a camera module includes a housing configured to accommodate a lens barrel; a first circuit board, disposed below the housing, including a first ground pad; a shield cover, disposed to cover the housing, including a surface and a through hole extending through the surface; and a second circuit board, disposed on one side surface of the housing, including a second ground pad corresponding to the first ground pad. The second ground pad is disposed to extend from a position connected to the first ground pad to a position corresponding to the through hole.

The camera module may further include a first solder connecting the first ground pad and the second ground pad; and a second solder, accommodated in the through hole, connecting the shield cover and the second ground pad.

The first solder and the second solder may be spaced apart from each other.

The through hole may be disposed at a predetermined distance upward from a lower end of the shield cover in the optical axis direction.

In another general aspect, a camera module includes a housing configured to accommodate a lens barrel; a first circuit board, disposed below the housing, including a first ground pad; a shield cover configured to cover the housing; a second circuit board, disposed on one side surface of the housing, including a second ground pad corresponding to the first ground pad; a first solder connecting the first ground pad and the second ground pad; and a second solder connecting the shield cover and the second ground pad. The second ground pad includes a first connection part connected to the first ground pad through the first solder and a second connection part connected to the shield cover through the second solder. The first solder and the second solder are spaced apart from each other.

The shield cover may have a surface and a through hole extending through the surface to expose a part of the second ground pad.

Other features and aspects will be apparent from the following detailed description, the drawings, and the claims.

Figure 1:
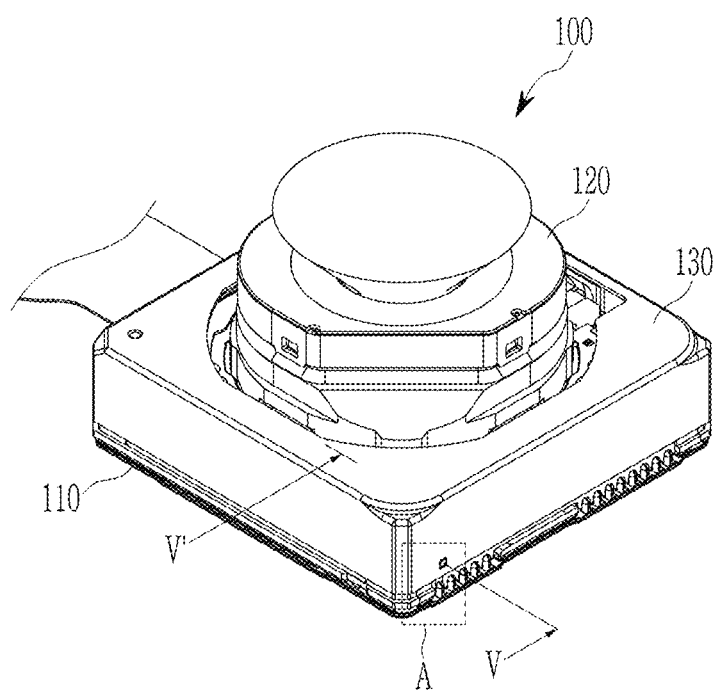
FIG. 1 is a perspective view illustrating the exterior of a camera module according to an embodiment.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

Figure 2:
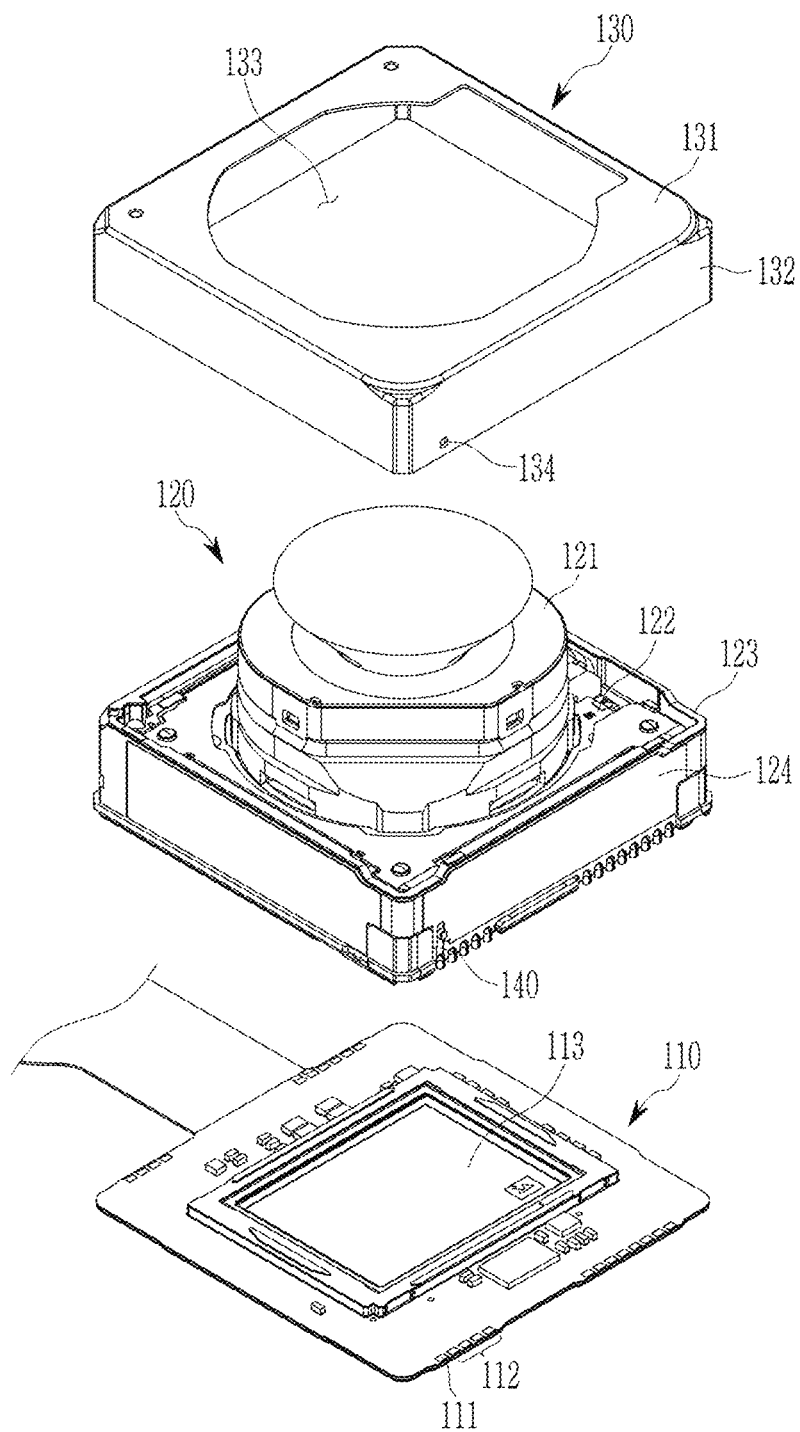
FIG. 2 is an exploded perspective view schematically illustrating the camera module shown in FIG. 1.

FIG. 1 is a perspective view illustrating the exterior of a camera module according to an embodiment. FIG. 2 is an exploded perspective view schematically illustrating the camera module shown in FIG. 1.

Referring to FIGS. 1 and 2, a camera module 100, according to an embodiment, includes a first circuit board 110, an optical unit 120, and a shield cover 130. The first circuit board 110 may be disposed below the optical unit 120, and the shield cover 130 may be disposed to cover the optical unit 120.

The first circuit board 110, electrically connected to a main board (not shown), includes a first ground pad 111 on one side surface for grounding the shield cover 130, and a first signal pad 112 for transmitting various types of signals. The first signal pad 112 may include a plurality of pads depending on the signal type. The first circuit board 110 may include a circuit board with a wiring pattern that can be electrically connected, such as a rigid circuit board, a flexible circuit board, or a rigid flexible circuit board.

Additionally, an image sensor 113 that converts light incident through a plurality of lenses of the optical unit 120 into an electric signal may be disposed on the first circuit board 110. The image sensor 113 may be electrically connected to the first circuit board 110, and may include charge coupled device (CCD), complementary metal oxide semiconductor (CMOS), charge priming device (CPD) and charge injection device (CID), but is not limited thereto. The electric signal converted by the image sensor 113 is output as an image through the display unit of the electronic device. In addition, a circuit pattern may be formed on the first circuit board 110 to allow electric signals to enter and exit, and various components such as condensers and resistors for driving the image sensor 113 may be disposed.

The optical unit 120 includes a lens barrel 121, a lens driving device 122 that moves the lens barrel 121, a housing 123 that accommodates the lens barrel 121, and a second circuit board 124 disposed on at least one side surface of the housing 123.

The lens barrel 121 may have a hollow cylindrical shape so that a plurality of lenses for imaging a subject may be accommodated therein, and the plurality of lenses are mounted on the lens barrel 121 along the optical axis. Here, the optical axis may be set as the central axis of the lens accommodated in the lens barrel 121, and the optical axis direction refers to a direction parallel to the central axis. A plurality of lenses are arranged as desired according to the design of the lens barrel 121, and each lens may have optical characteristics such as the same or different refractive index. An image sensor 113 is disposed below the lens barrel 121 along the optical axis to convert light incident through the lens barrel 121 into an electric signal. The electric signal may be transmitted to the first circuit board 110 and transmitted to electronic devices such as mobile phones.

Although not shown, an optical filter may be disposed between the lens barrel 121 and the image sensor 113. An optical filter may block light in a specific frequency bandwidth from light passing through a lens from entering the image sensor. The optical filter may be disposed parallel to a direction perpendicular to the optical axis. The optical filter may include an IR cut-off filter.

The lens driving device 122 includes a device that moves the lens barrel 121, which includes an auto focus (AF) driver (not shown) and an optical image stabilization (OIS) driver (not shown). For example, the AF driver includes an AF driving magnet and an AF driving coil, and may implement a focus adjustment function or a zoom function by moving the lens barrel 121 along the optical axis by electromagnetic influence between the AF driving magnet and the AF driving coil. In addition, the OIS driver includes an OIS driving magnet and an OIS driving coil, and may implement a function of correcting shake, such as hand shake or other movements of the user by moving the lens barrel 121 in a direction perpendicular to the optical axis by electromagnetic influence between the OIS driving magnet and the OIS driving coil.

The housing 123 accommodates the lens barrel 121 and the lens driving device 122 in an internal space. For example, the housing 123 may have a box shape with an open upper part and lower part. The first circuit board 110 is disposed below the housing 123.

The second circuit board 124 may be disposed on at least one side surface of the housing 123 and coupled to the housing 123. The second circuit board 124 may be a circuit board with a wiring pattern, such as a flexible circuit board or a rigid flexible circuit board. The second circuit board 124 may have a laterally curved shape. For example, when the housing 123 has a frame shape with four corners, the second circuit board 124 may cover two or more of the four side surfaces of the housing 123.

The shield cover 130 may be coupled to the housing 123 to cover the housing 123. The shield cover 130 has an open lower part and may have a frame shape with four corners. The shield cover 130 protects the internal components of the camera module 100. The shield cover 130 may be made of a metal plate or a material with a low corrosion rate, such as stainless steel. Additionally, the shield cover 130 may function to shield electromagnetic waves. For example, the shield cover 130 may shield electromagnetic waves to prevent electromagnetic waves generated inside the camera module 100 from affecting other electronic components within the electronic device or noise current flowing from outside the camera module 100 from affecting the inside of the camera module 100. The shield cover 130 may be grounded to the first circuit board 110 to shield electromagnetic waves inside and outside the camera module 100.

The shield cover 130 includes an upper surface part 131 disposed upward in the optical axis direction and disposed along a direction perpendicular to the optical axis. A side surface part 132 extending downward from the upper surface part 131 along the optical axis direction. The upper surface part 131 may have a quadrangle shape, and an opening 133 may be formed in the center. The middle part of the lens barrel 121 may be exposed through the opening 133, and the lens may also be exposed to allow light to pass through. The side surface part 132 may extend downward from the edge of the upper surface part 131 along the optical axis direction. For example, the side surface part 132 may have four surfaces, and adjacent surfaces may be perpendicular to each other. The side surface part 132 may have a quadrangular pillar shape with open upper and lower parts. However, the shape of the side surface part 132 is not limited thereto. For example, the side surface part 132 may have a cylindrical or hemispherical shape with an open lower part.

Figure 3:
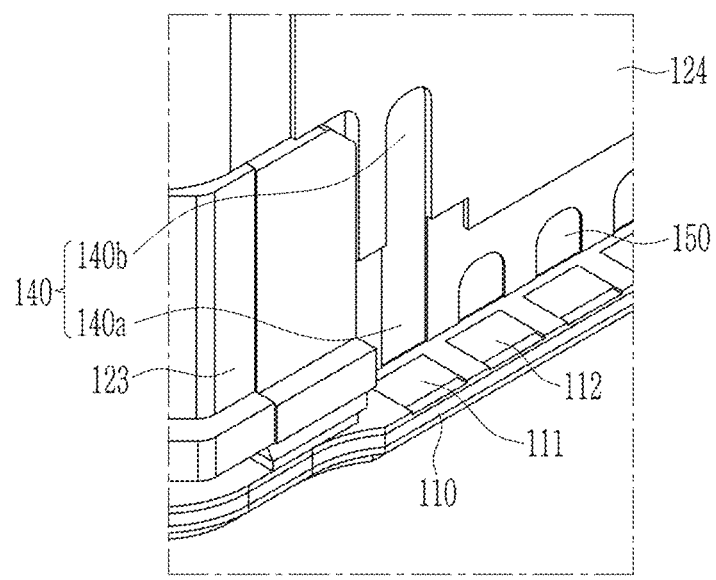
FIG. 3 is a partial enlarged view illustrating the state in which the second circuit board is disposed in portion A of FIG. 1.
Figure 4:
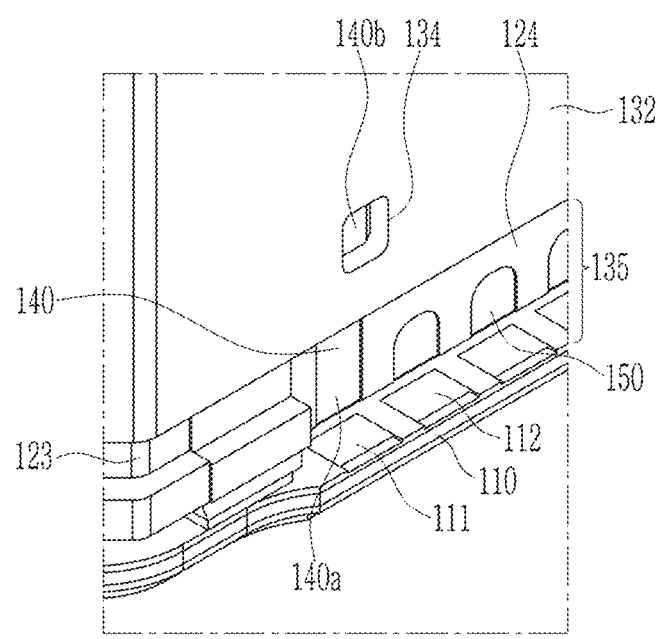
FIG. 4 is a partial enlarged view illustrating the state in which the shield cover is disposed in portion A of FIG. 1.
Figure 5:
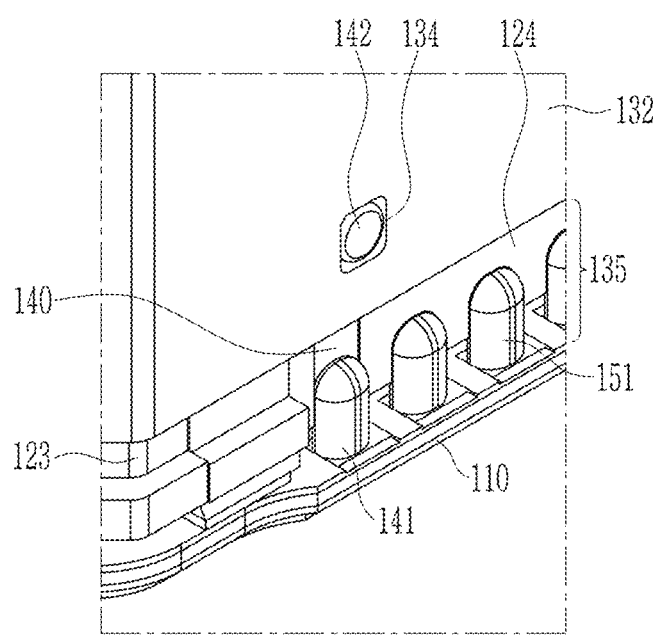
FIG. 5 is a partial enlarged view illustrating the state in which a solder is formed in portion A of FIG. 1.
Figure 6:
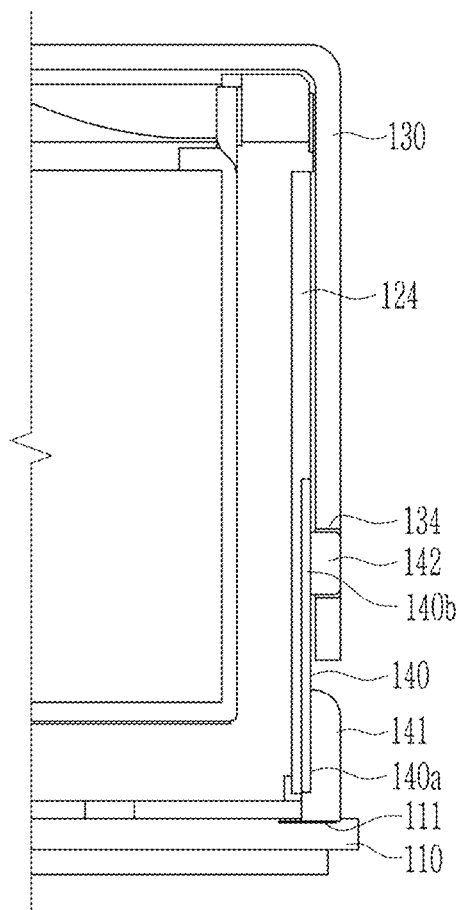
FIG. 6 is a partial cross-sectional view taken along line V-V' in FIG. 1.

FIG. 3 is a partially enlarged view illustrating the state in which the second circuit board is disposed in portion A of FIG. 1. FIG. 4 is a partially enlarged view illustrating the state in which the shield cover is disposed in portion A of FIG. 1. FIG. 5 is a partially enlarged view illustrating the state in which a solder is formed in portion A of FIG. 1. FIG. 6 is a partial cross-sectional view taken along line V-V' in FIG. 1.

Referring to FIGS. 3 to 6, the shield cover 130 has a through hole 134 formed on one surface of the side surface part 132. The through hole 134 may be formed to be spaced apart from the lower end of the side surface part 132 by a predetermined distance upward in the optical axis direction. The through hole 134 is a hole that penetrates the shield cover 130 in the thickness direction, and may have various shapes such as circular, oval, or quadrangle.

The second circuit board 124 includes a second ground pad 140 and a second signal pad 150. The second ground pad 140 may be disposed at a position corresponding to the first ground pad 111 of the first circuit board 110, and the second signal pad 150 may be disposed at a position corresponding to the first signal pad 112 of the first circuit board 110. The second ground pad 140 and the second signal pad 150 may be disposed in a direction opposite to the direction in which the second circuit board 124 faces the housing 123. The second ground pad 140 and the second signal pad 150 may be disposed on the second circuit board 124 or may be disposed not to exceed the thickness of the second circuit board 124. In the latter case, a groove may be formed on one surface of the second circuit board 124 facing the shield cover 130, and the second ground pad 140 and the second signal pad 150 may be disposed in the groove.

The second ground pad 140 may be disposed to extend from a position connected to the first ground pad 111 to a position corresponding to the through hole 134. Accordingly, the second ground pad 140 may be formed to be longer than the second signal pad 150. The second ground pad 140 includes a first connection part 140a disposed at a position corresponding to the first ground pad 111 and a second connection part 140b disposed at a position corresponding to the through hole 134 of the shield cover 130. A portion of the second ground pad 140 may be exposed when the shield cover 130 is coupled to the housing 123. A part including the first connection part 140a of the second ground pad 140 may be exposed in a separation space 135 formed between the first circuit board 110 and the lower end of the shield cover 130, and a part of the second connection part 140b may be exposed from the through hole 134.

A first solder 141 and a second solder 142 may be formed in the first connection part 140a and the second connection part 140b of the second ground pad 140, respectively. The first solder 141 may be formed on the first connection part 140a and the first ground pad 111 to connect the first ground pad 111 and the second ground pad 140. The first solder 141 may be disposed in the separation space 135, and may be formed to cover a part of the second ground pad 140 exposed in the separation space 135. Accordingly, the first solder 141 is spaced apart from the shield cover 130. The second solder 142 may be formed on the second connection part 140b to connect the shield cover 130 and the second ground pad 140. The second solder 142 may be formed to be accommodated in the through hole 134. Accordingly, the first solder 141 and the second solder 142 may be spaced apart from each other.

For example, the first solder 141 and the second solder 142 may be formed through a soldering process using a soldering iron or the like. At this time, the first solder 141 and the second solder 142 may be formed within the outer surface of the shield cover 130. Additionally, the first solder 141 and the second solder 142 may be formed so as not to protrude outside the first circuit board 110. As such, the camera module 100, according to an embodiment, is formed so that the first solder 141 and the second solder 142 do not protrude outside the first circuit board 110 or the shield cover 130, thereby reducing the impact on other components.

By forming the first solder 141 and the second solder 142 on the second ground pad 140, the second ground pad 140 may be connected to the first ground pad 111 on the first connection part 140a through the first solder 141, and may be connected to the shield cover 130 on the second connection part 140b through the second solder 142. Accordingly, the first circuit board 110 and the shield cover 130 may be connected to each other via the second circuit board 124. The second ground pad 140 may be insulated from other circuits of the second circuit board 124. Accordingly, the shield cover 130 is grounded to the first circuit board 110 and may serve to shield electromagnetic waves from the camera module 100.

As such, the soldering part for connecting the first circuit board 110, the second circuit board 124, and the shield cover 130 includes the first solder 141 and the second solder 142, so that the stress applied to the soldering part may be distributed compared to the case where the soldering part is made of a solder. Accordingly, the risk of cracks occurring in the soldering part may be reduced. Additionally, by forming the soldering part at a plurality of locations, the amount of solder may be reduced compared to the case of forming a single solder. Thus, the thickness of the soldering portion may be reduced so that the soldering part does not protrude to the outside of the shield cover 130 or the first circuit board 110.

One or more second signal pads 150 may be disposed corresponding to the first signal pad 112 of the first circuit board 110, and a third solder 151 may be formed to connect the first signal pad 112 and the second signal pad 150. When there are pluralities of first and second signal pads 112 and 150, a corresponding plurality of third solders 151 may be formed on the first and second signal pads 112 and 150. The third solder 151 may be disposed in the separation space 135 and may be spaced apart from the shield cover 130. For example, the third solder 151 may be formed through a soldering process using a soldering iron or the like. The third solder 151 may also not protrude to the outside of the first circuit board 110 or the shield cover 130, thereby minimizing the impact on other components.

The first circuit board 110 and the second circuit board 124 may be connected to each other by the third solder 151 formed on the first signal pad 112 and the second signal pad 150. The connection includes not only physical connection but also electrical connection.

Figure 7:
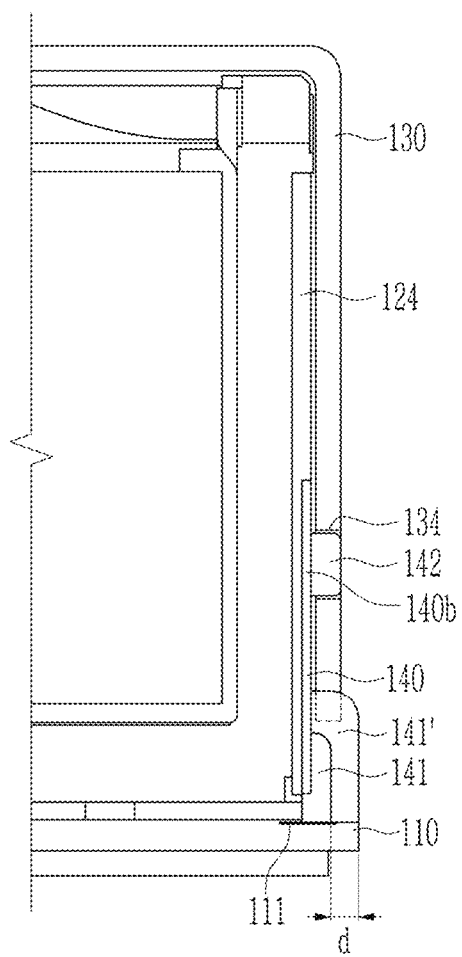
FIG. 7 is an enlarged cross-sectional view of the soldering part of the camera module according to an embodiment.

FIG. 7 is an enlarged cross-sectional view of the soldering part of the camera module according to an embodiment.

Referring to FIG. 7, in the case of a camera module according to an embodiment, the first solder 141 or the second solder 142 may be formed within the outer surface of the shield cover 130. That is, the first solder 141 or the second solder 142 may be formed so as not to protrude to the outer surface of the shield cover 130. Additionally, the first solder 141 or the second solder 142 may be formed to be disposed inwardly by a predetermined distance from the outside of the first circuit board 110. In contrast, when forming one solder 141' according to the Comparative Example, since the solder 141' is formed on the shield cover 130, the solder 141' protrudes outwardly from the shield cover 130.

As such, the camera module, according to an embodiment, forms two solders 141 and 142, thereby reducing the amount of each solder compared to the case of forming one solder 141' according to the Comparative Example, and the thickness of the soldering part becomes thinner by d. In addition, because the first solder 141 and the second solder 142 are formed on the second ground pad 140 disposed on the second circuit board 124, the first solder 141 and the second solder 142 may be formed inward by d compared to the solder 141', which is formed on the shield cover 130. Therefore, it is possible to control the level at which the first solder 141 and the second solder 142 protrude outside the first circuit board 110 or the shield cover 130, thereby reducing the impact on other components.

One aspect of the disclosed embodiment seeks to provide a camera module capable of reducing the risk of cracks in the camera module by improving the soldering shape for grounding.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing configured to accommodate a lens barrel;
   a first circuit board, disposed below the housing, comprising a first ground pad;
   a shield cover configured to cover the housing;
   a second circuit board, disposed on one side surface of the housing, comprising a second ground pad corresponding to the first ground pad;
   a first solder connecting the first ground pad and the second ground pad; and
   a second solder connecting the shield cover and the second ground pad,
   wherein the second ground pad comprises a first connection part connected to the first ground pad through the first solder and a second connection part connected to the shield cover through the second solder.

2. The camera module of claim 1, wherein
   the shield cover has a surface and a through hole extending through the surface to expose a part of the second ground pad.

3. The camera module of claim 2, wherein
   the second solder is accommodated in the through hole.

4. The camera module of claim 1, wherein
   the shield cover and the first solder are spaced apart.

5. The camera module of claim 1, wherein
   a separation space is formed between the first circuit board and the lower end of the shield cover,
   and the first solder is disposed in the separation space.

6. The camera module of claim 1, wherein
   the first solder or the second solder is formed planar to an outer surface of the shield cover.

7. The camera module of claim 1, wherein
   an image sensor, disposed on the first circuit board, is configured to convert light incident through the lens barrel into an electric signal,
   and the second circuit board is a flexible circuit board or a rigid flexible circuit board.

8. The camera module of claim 1, wherein
   the first circuit board comprises a first signal pad, and
   the second circuit board comprises a second signal pad, and
   the camera module further comprises a third solder connecting the first signal pad and the second signal pad.

9. The camera module of claim 8, wherein
   the second ground pad is longer than the second signal pad.

10. A camera module, comprising:
    a housing configured to accommodate a lens barrel;
    a first circuit board, disposed below the housing, comprising a first ground pad;
    a shield cover, disposed to cover the housing, comprising a surface and a through hole extending through the surface; and
    a second circuit board, disposed on one side surface of the housing, comprising a second ground pad corresponding to the first ground pad,
    wherein the second ground pad is disposed to extend from a position connected to the first ground pad to a position corresponding to the through hole.

11. The camera module of claim 10, further comprising:
    a first solder connecting the first ground pad and the second ground pad; and
    a second solder, accommodated in the through hole, connecting the shield cover and the second ground pad.

12. The camera module of claim 11, wherein
    the first solder and the second solder are spaced apart from each other.

13. The camera module of claim 10, wherein
    the through hole is disposed at a predetermined distance upward from a lower end of the shield cover in the optical axis direction.

14. A camera module, comprising:
    a housing configured to accommodate a lens barrel;
    a first circuit board, disposed below the housing, comprising a first ground pad;
    a shield cover configured to cover the housing;
    a second circuit board, disposed on one side surface of the housing, comprising a second ground pad corresponding to the first ground pad;
    a first solder connecting the first ground pad and the second ground pad; and
    a second solder connecting the shield cover and the second ground pad,
    wherein the second ground pad comprises a first connection part connected to the first ground pad through the first solder and a second connection part connected to the shield cover through the second solder, and
    the first solder and the second solder are spaced apart from each other.

15. The camera module of claim 14, wherein the shield cover has a surface and a through hole extending through the surface to expose a part of the second ground pad.

* * * * *